US008888981B2

(12) United States Patent
De Sanoit et al.

(10) Patent No.: US 8,888,981 B2
(45) Date of Patent: Nov. 18, 2014

(54) DETECTION METHOD USING AN ELECTROCHEMICALLY-ASSISTED ALPHA DETECTOR FOR NUCLEAR MEASUREMENT IN A LIQUID MEDIUM

(75) Inventors: Jacques De Sanoit, Rungis (FR); Christine Mer-Calfati, Vauhaullan (FR); Michal Pomorski, Massy Palaiseau (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/877,907

(22) PCT Filed: Oct. 7, 2011

(86) PCT No.: PCT/EP2011/067582
§ 371 (c)(1), (2), (4) Date: Apr. 8, 2013

(87) PCT Pub. No.: WO2012/045872
PCT Pub. Date: Apr. 12, 2012

(65) Prior Publication Data
US 2013/0186762 A1 Jul. 25, 2013

(30) Foreign Application Priority Data
Oct. 7, 2010 (FR) ...................... 10 58150

(51) Int. Cl.
| | |
|---|---|
| *C25B 1/00* | (2006.01) |
| *G01T 1/204* | (2006.01) |
| *G01T 1/26* | (2006.01) |
| *G01T 1/178* | (2006.01) |
| *G01T 1/167* | (2006.01) |

(52) U.S. Cl.
CPC ................. *G01T 1/167* (2013.01); *G01T 1/204* (2013.01); *G01T 1/26* (2013.01); *G01T 1/178* (2013.01)
USPC ................................ 205/43; 205/81; 205/316

(58) Field of Classification Search
USPC ....................................................... 205/43, 81
See application file for complete search history.

(56) References Cited

U.S. PATENT DOCUMENTS

| | | | |
|---|---|---|---|
| 2008/0061235 A1* | 3/2008 | Guerrero et al. ........... | 250/336.1 |
| 2011/0108433 A1 | 5/2011 | De Sanoit et al. | |

FOREIGN PATENT DOCUMENTS

FR    2 917 229    12/2008

OTHER PUBLICATIONS

"Preparation of Actinides for α Spectrometry without Electrodeposition" by Sill et al., Anal. Chem. 53(3), pp. 412-415 (1981).*

(Continued)

*Primary Examiner* — Bryan D. Ripa
(74) *Attorney, Agent, or Firm* — Nixon Peabody LLP (57) ABSTRACT

An in situ method for detecting alpha particles contained in a liquid medium, which uses a system which includes a counter-electrode and an alpha particle detector including a substrate made of an intrinsic semiconductor material sandwiched between two electrical contacts, wherein the contact intended to be in contact with the liquid medium is made of boron-doped diamond. By forming a particular electrolyte 8 and by causing a current to flow between counter-electrode and the boron-doped diamond contact in contact with the liquid medium, actinides or polonium present in the liquid medium may be concentrated on the boron-doped diamond contact, and by this means the detection limit of the alpha emitters may be lowered.

9 Claims, 4 Drawing Sheets

(56) References Cited

OTHER PUBLICATIONS

English Abstract of Vitorge, P. "Chimie des Actinides" [Chemistry of Actinides], Techniques de lingenieur, BN 3520, Jul. 10, 1999.*

Kozlov, S.F. et al., "Usage of Diamond Detectors as Immersed Alpha-Counters", IEEE Transactions on Nuclear Science, vol. NS-24, No, 1, pp. 242-243, Feb. 1977.

Feist, I. et al., "The Operation of Silicon Alpha Detectors in Nitrate Solutions", Radiochemical and Radioanalytical Letters, vol. 36 (2-3), pp. 101-106, Oct. 1978.

Krapivin, M.I. et al., "Individual Determination of Alpha-Emitting Nuclides in Solution by Means of a Submerged Alpha Spectrometer", English publication translated from Radiokhimiya, vol. 21, No. 2, pp. 321-323, Mar.-Apr., 1979.

Robert, A. et al., "Measurement System for Alpha Emitter in Solution", Nuclear Instruments and Methods in Physics Research, vol. 225, Issue 1, pp. 179-184, Aug. 1984.

Bergonzo, P. et al., "Corrosion hard CVD diamond alpha particle detectors for nuclear liquid source monitoring", Diamond and Related Materials, vol. 9, Issues 3-6, pp. 1003-1007, Apr.-May 2000.

Egorov, O.B. et al., "Direct measurement of alpha emitters in liquids using passivated ion implanted planar silicon (PIPS) diode detectors", Nuclear Instruments and Methods in Physics Research A, vol. 537, Issue 3, pp. 600-609, Available online Sep. 11, 2004.

Vitorge, P. "Chimie des actinides" [Chemistry of actinides], Techniques de l'ingenieur, BN 3520, Jul. 10, 1999.

Mer, C. et al., "Diamond Detectors for Alpha Monitoring in Corrosive Media for Nuclear Waste Activity Monitoring", 2009 1st International Conference on Advancements in Nuclear Instrumentation, Measurement Methods and Their Applications, Animma 2009, 4 pp., Jun. 2009.

International Search Report and Written Opinion in International Application No. PCT/EP2011/067582, mailed Jan. 23, 2012.

* cited by examiner

DETECTION METHOD USING AN ELECTROCHEMICALLY-ASSISTED ALPHA DETECTOR FOR NUCLEAR MEASUREMENT IN A LIQUID MEDIUM

CROSS REFERENCE TO RELATED APPLICATIONS OR PRIORITY CLAIM

This application is a National Phase of PCT/EP2011/067582, filed Oct. 7, 2011, entitled, "DETECTION METHOD USING AN ELECTROCHEMICALLY-ASSISTED ALPHA DETECTOR FOR NUCLEAR MEASUREMENT IN A LIQUID MEDIUM", which claims the benefit of French Patent Application No. 10 58150, filed Oct. 7, 2010, the contents of which are incorporated herein by reference in their entirety.

TECHNICAL FIELD

The invention relates to a method allowing α particle emitters present in solution, notably actinides and polonium, to be detected and measured. More particularly, the invention relates to a detection method using an electrochemically-assisted alpha detector for nuclear measurement in a liquid medium.

STATE OF THE PRIOR ART

As with all industries inherent to human activity, the nuclear industry generates solid, gaseous or liquid by-products. In particular, the nuclear industry produces large quantities of effluents, which may be inactive or, on the contrary, weakly or highly radioactive. It is recalled that the term effluent designates all liquid discharges conveying a polluting load (whether dissolved or in the form of particles) which is harmful to the environment.

Effluents which are weakly radioactive are filtered, diluted and inspected before being dispersed into the environment. The discharge conditions are, naturally, rigorously regulated and controlled by a competent safety authority, so as to ensure a very low environmental impact, and no risk for health. As an example, prefectorial decree n°2009.PREF.DCI 2/BE 0172 of Sep. 25, 2009 now regulates radioactive discharges of installations classified for environmental protection (ICPE), and also the annual limits allowed for discharges of liquid effluents. Thus, the Saclay Centre of the "Commissariat à l'énergie atomique et aux énergies alternatives" is authorised to discharge, at maximum, a total alpha emitter activity of 0.20 GBq per year.

In the context of the invention, one concern is the quantification of particular alpha particle emitters, such as actinides and polonium, which are present in aqueous solutions, whether these particles are from solutions resulting from washing laboratory floors in controlled areas, effluent evaporation condensates, or other solutions.

To determine the quantity of actinides and/or polonium present in an aqueous solution, a sample of the solution may be taken for analysis, and the radioactivity of this sample may be compared with the radioactivity of standard sources.

The disadvantage of this method is that it requires very lengthy operations to separate, purify and prepare the samples and standard sources for counting and spectrometry of the actinides or polonium.

Under such operating conditions, if a sample is made with an analytic aim, the measurement result is known only after several days.

And given that the competent safety authority gives its agreement to the evacuation of effluents only after it is sent a measurement result in conformity with the discharge standards in force, it may easily be understood that it is of particular interest to wish to shorten drastically the period for obtaining these results.

Another approach consists in measuring the alpha activity directly in the solution to be analysed, without taking any samples, by immersing an alpha radiation detector in the solution containing the actinide ions.

This approach is not a new one. Indeed, in 1977 natural diamond was successfully tested as a material for detecting alpha particles immersed in a solution of $^{239}$Pu in a concentrated nitric acid medium (2 M), within a range of concentrations of 10 to 100 mg/L (see document [1] referenced at the end of the description). The alpha particles are detected and the height of the pulses are measured by polarising the diamond detector at 300 V and by using a signal amplifier and a multi-channel analyser.

The advantage of this technique is that it enables the delicate problem of the preparation of the standard alpha-sources to be overcome. However, this technique is limited in terms of performance: indeed, it does not enable volume alpha activities of less than 20 kBq/cm$^3$ to be measured, since the signal recorded for such volume activities cannot be used for analytical purposes.

Other work has been undertaken on direct analysis in solution of alpha activity using surface barrier detectors, notably in works published by Feist (document [2]) or again by Krapivin (document [3]). Despite an apparently promising potential, these works have never led to any industrial applications, due to insufficient stability of this type of detector.

In the literature one also finds tests for direct measurement of alpha radioactivity by immersion of detectors in acidic solutions deriving from the nuclear fuel reprocessing industry using glass scintillators (document [4]). Unfortunately, this technique was very rapidly abandoned due to its high sensitivity to interference with the β and γ radiation deriving from fission products initially present in the solution.

Subsequently, the manufacture of synthetic diamond layers on silicon substrates, notably using the CVD (Chemical Vapour Deposition) method, enabled it to be envisaged to produce detection systems of interest for direct analysis in solution of the alpha activity using this innovative material, which can be used in a hostile medium (due to its being corrosive and irradiated) (document [5]). But these measuring systems do not enable volume alpha activities of less than 0.4 kBq/cm$^3$ to be measured.

Finally, more recently, detectors of the PIPS (Passive Ion implant Planar Silicon) type have been used to detect alpha particles at the surface of a liquid (document [6]). Although such detectors do not truly belong to the family of immersed detectors, the experimental purpose remains the same, namely direct measurement without preparation of standard sources, which is combined with elimination of the risk of corrosion of the detector by an acidic radionuclide solution. However, this type of detector has shown a sensitivity to β and γ radiation, thus requiring energy discrimination to extract the alpha activity from the experimental data.

In the light of the problems encountered in the prior art, the inventors set themselves the goal of designing a detection method capable of measuring alpha activity in a liquid medium, even for α volume alpha activities of less than 0.025 Bq/cm$^3$.

DESCRIPTION OF THE INVENTION

This aim is achieved by virtue of a method for detecting the alpha activity of a liquid medium containing ions of at least one actinide and/or polonium ions, wherein said method includes the following successive steps:

a) provision of an in situ system for detecting alpha particles in a liquid medium, which includes:
   an alpha particle detector including an assembly formed of a substrate made of an intrinsic semiconductor material which is sandwiched between two layers made of electrically conductive materials, respectively forming a first and a second electrical contact, wherein the first contact is intended to be in contact with the liquid medium, and is made from boron-doped diamond;
   a counter-electrode made of an electrically conductive material, intended to be brought into contact with the liquid medium; and
   means to connect said counter-electrode and the first electrical contact of the detection system's detector to an electrical current source in order to allow the ions present in the liquid medium to flow from the counter-electrode to the detector's first electrical contact, or vice versa;

b) bringing the first contact of the detection system's detector into contact with the liquid medium, and bringing the detection system's counter-electrode into contact with the liquid medium;

c) detection of the alpha particles which are stopped in the detector's substrate after passing through said detector's first electrical contact;

wherein the method further includes, before step c), the following successive steps:
   a step of preparation of an electrolyte (8) including ions of at least one actinide and/or polonium ions in the form of soluble complexes obtained from said ions of at least one actinide and/or from said polonium ions present in the liquid medium by adding a complexing salt, and possibly an element chosen from among an acid or a base, to the liquid medium, and by applying, after step b), an electrical current between the detection system's counter-electrode and the first electrical contact of the detection system's detector;
   a step of electroprecipitation of said actinide and/or polonium ions in the form of insoluble actinide and/or polonium hydroxides on the first contact of the detection system's detector, by maintaining said electrical current between the detection system's counter-electrode and the first electrical contact of the detection system's detector, wherein the alpha particles detected in step c) derive at least partly from the insoluble actinide and/or polonium hydroxides present on the first electrical contact.

It is stipulated that the diamond is doped with boron, at a doping rate of between $10^{20}$ and $2.10^{21}$ boron atoms per cm$^3$.

The diamond is preferably polycrystalline, but it may also be monocrystalline.

The substrate is preferably made of silicon, whether monocrystalline or polycrystalline, or of polycrystalline diamond. The substrate can also be made of monocrystalline diamond if it is desired to use the detector for the purpose of spectrometry of the alpha emitters.

The detector of the detection system according to the invention advantageously further includes a layer made of electrically insulating material which covers the surface of the assembly, except for at least a portion of the surface of the first electrical contact. This layer made of electrically insulating material is preferably made of a material which is resistant to chemical attacks. The detector protected in this manner may then be immersed, at least partially, in the liquid medium without being damaged. This may be a conventional passivation material, such as a coating resin, for example a resin of the epoxy type. It is stipulated that, in light of the lower levels of radioactivity presumed to be measured by the detector of the detection system according to the invention, resistance to alpha radiation of this electrically insulating material used as the coating of the detection system is not a critical parameter.

It is clearly understood that the direction of movement of the counter-electrode's ions towards the first contact, or vice versa, depends on the direction of application of the electrical current. The first contact then acts as the working electrode and the counter-electrode as the auxiliary electrode or secondary electrode.

The counter-electrode may be made of any material which cannot be attacked electrochemically in the chemical medium imposed by the composition of the supporting electrolyte, such as, for example, gold or tantalum, etc. The counter-electrode may also, for example, be made of boron-doped diamond. However, the counter-electrode is preferably a platinum electrode.

It is stipulated that the manner used to detect the actinides is known to those skilled in the art. It may consist of nuclear measurement; in this case the detection of the alpha particles emitted from the actinide atoms is accomplished by collecting—after previously applying an electrical field between the first and the second contact—the electrical charges produced by the creation of electron-hole pairs in the substrate following the interaction of the alpha particles with the detector's substrate, made of intrinsically semiconductor material. Detection of the actinide atoms may also consist of measuring X-ray fluorescence (XRF) spectrometry; in this case detection consists of exciting the actinide atoms by X-rays, and in measuring the X-ray fluorescence radiation produced in this manner using a specific detector external to the detection system according to the invention.

The effect of applying an electrical current between the counter-electrode and the detector is to produce, at the interface between the first contact of the detection system's detector and the electrolyte, a local increase of the pH following the electro-reduction of the liquid medium (which is preferably an aqueous medium).

It is stipulated that a complexing salt (also called a complexing background salt), and possibly an element chosen from among an acid or a base during the step of preparation of the electrolyte, may be added before step c), but may be added before step b) or after step b).

The formation of an electrolyte enabling the actinide and/or the polonium ions to be complexed is obtained by adding a complexing agent into the liquid medium and, if required, by adjusting the pH value through the addition, as required, of an acid or a base to the liquid medium. The complexing agent is in this case preferentially the sulphate ion provided by sodium sulphate $Na_2SO_4$. The sodium sulphate therefore plays two different roles, namely that of complexing agent and that of background salt, allowing electrical charges to be conducted within the electrolyte. As we shall see below, the pH of the electrolyte is, possibly after adjustment through the addition of a base or acid, preferably equal to between 4 and 4.5.

One of the advantages of the invention is that, during the step of electroprecipitation, the detector's first contact acts as the electrode: when an electrical current is applied between the first boron-doped diamond contact and the system's counter-electrode the current flows between the first contact and the counter-electrode through the complexing background salt present in the electrolyte (for example, dissociation of the $Na_2SO_4$ into $Na^+$ and $SO_4^{2-}$ in the water), which acts as the charge-carrier, and leads to the actinide and/or polonium ions being deposited in the form of hydroxides on the surface of the detector's first electrical contact. This step of electroprecipitation enables us by this means to concentrate, on the detector's first electrical contact, the alpha particle emitters present in the liquid medium.

The effect of adding an acid or a base to the liquid medium containing the complexing salt is to set the pH of the electrolyte to an optimum value allowing soluble complexes of the actinide and/or polonium ions to be formed, and by this means prevents radiocolloids and/or precipitates from being formed within the electrolyte before the electroprecipitation occurs on the system's first contact.

The saline charge added to the liquid medium by incorporation of a complexing salt also enables satisfactory conductivity of the electrolyte to be obtained, reducing the ohmic drop between the detector's first electrical contact and the counter-electrode (i.e. at the terminals of the electrolysis cell).

The method may advantageously also include, after step c), a step of decontamination of the first contact of the detection system's detector in an electrolyte by applying an electrical current between the first contact and the counter-electrode, wherein the direction of the current is reversed relative to the direction of the current applied during the step of electroprecipitation.

The electrolyte used to accomplish the decontamination may possibly have the same chemical composition as that of the electrolyte used during the step of electroprecipitation, except that this electrolyte will not contain actinide and/or polonium ions.

Before the step of electrodecontamination, a first coarse cleaning of the first contact may also be undertaken in a diluted acid solution.

This step of electrodecontamination enables the detection system's detector to eliminate the deposit of alpha emitter hydroxides, making the detector able to be used once again. We therefore have a simple and effective method of electrodecontamination of the detection system's detector, which does not require the use of an experimental device of different design.

An electrodecontamination of the detector may be accomplished, for example, in an aqueous solution of $[Na_2SO_4]$ concentrated at 0.3 M, by applying a current density of between +4 and +6 $mA/cm^2$ for 15 minutes (and, of course, reversing the direction of the current relative to the current applied during the step of electroprecipitation).

The detection system's detector is preferably brought into contact with the liquid medium in step b) of the method by immersing the detector in the liquid medium. This immersion can be total or partial. It should be noted that this action of bringing the first electrical contact into contact with the liquid medium is not necessarily accomplished by immersion of the detector; for example, it may be obtained by pouring the liquid medium into a container, the base of which is formed by the first electrical contact. Immersion of the detector is, however, more advantageous, since the detector is then mobile and can be dipped and positioned at the desired depth within the liquid medium.

The electrolyte advantageously has a pH of between 4 and 4.5. The pH is preferably adjusted to a value of between 4 and 4.5 and the complexing salt concentration is adjusted to 0.3 M.

The complexing salt used is preferably sodium sulphate.

The electrolyte is preferably an aqueous solution. According to one variant, the electrolyte is an aqueous solution and also contains a solvent chosen from among dimethyl sulfoxide (DMSO) and dimethylformamide (DMF) in variable proportions.

It is stipulated that, when the liquid medium contains surfactants it is preferable to destroy them before proceeding with the electroprecipitation of the actinide or polonium hydroxides. Indeed, due to their great complexing power, the presence of surfactants in certain liquid media such as, for example, floor washing water, can hinder electroprecipitation of the actinide or polonium ions. They can be destroyed by oxidising them before step a), or during step a), through the addition of oxidants to the liquid medium. As an example, an elegant method of oxidant destruction of a surfactant such as sodium dodecylbenzenesulfonate (SDS) may easily be obtained through the use of free radicals anodically electro-generated on a diamond electrode of large area (several $cm^2$) which is weakly doped with boron ($10^{19}$ boron atoms/$cm^3$), either in potentiostatic mode (E>+2.5 V/Ag—AgCl), or in galvanostatic mode (J>+4 $mA/cm^2$).

Said at least one actinide is advantageously chosen from among the isotopes of americium, curium, neptunium, plutonium and uranium. In respect of uranium isotopes, the invention can indeed be used to detect uranium isotopes (17 isotopes including $^{238}U$; $^{235}U$ and $^{234}U$), most of which are alpha emitters with a longer radioactive period than americium, curium, neptunium or plutonium, and the mass activity of which remains very low. In this case it is preferable, after electroprecipitation of the uranium on the detector's first electrical contact, to undertake an X-ray fluorescence spectrometry measurement, rather than a nuclear measurement.

The liquid medium including the alpha emitters may be an effluent, for example floor washing water or a distillate/condensate derived from a radioactive effluent.

BRIEF DESCRIPTION OF THE DRAWINGS

The invention will be better understood and other advantages and features will appear on reading the following description, which is given as a non-restrictive example, accompanied by the appended drawings, among which.

DETAILED DESCRIPTION OF PARTICULAR EMBODIMENTS

The detection method according to the invention is used to detect alpha emitters contained in a liquid medium, for example in an aqueous solution.

The method according to the invention could be used in a conventional immersed detector mode, i.e. without having to undertake a prior step of electroprecipitation of the actinides and/or of the polonium, when the volume activity of the liquid medium to be measured is sufficient.

Conversely, when the alpha emitter concentration is low in the liquid medium (i.e. less than approximately $0.4\,kBq/cm^3$), it is preferable to use the detection system including a counter-electrode, in order that the actinide and/or polonium ions may be concentrated on the detector's first contact, before undertaking the nuclear measurement. Indeed, if the counter-electrode electrode is present in the detection system this enables the actinides and/or polonium to be concentrated at the surface of the detector's first contact by an electrochemical method which, ultimately, enables the detection limit to be lowered. To achieve this, the sulphate ions are used to complex at a controlled pH value the actinide and/or polonium ions contained in the liquid medium, and electroprecipitation of the actinide and/or polonium ion hydroxides is accomplished on the detector's first contact by electrochemical means.

Bearing in mind that it is an "electrochemical" impossibility to accomplish metal deposition of actinides on the surface of a working electrode from an aqueous solution, achieving a concentration of actinide ions on the detector's electrical contact appeared difficult to accomplish. Indeed, if the value of the standard potentials $E_0$ of the different $M^{3+}/M^0$ pairs (where M is an actinide) is observed, it is seen that they all have a very negative standard potential value ($E_0 < -2$ V/ENH, where ENH is the Standard Hydrogen Electrode which, by convention, is the "zero volt" reference of the potential scale) (document [7]). Actinide ions cannot therefore be deposited on the electrical contact in metallic form.

Furthermore, when the aqueous solution is acidic, as is generally the case with aqueous solutions including actinide ions, the accessible field of potential is limited by the $H_2/H^+$ system in terms of reduction, where E=0 V/ENH, and by the $H_2O/O_2$ system in terms of oxidation, where E=+1.23 V/ENH, giving an accessible field of potential in a range of 0 to +1.23 V.

Outside this field of potential no electrochemical reaction is possible, except for the electrochemical decomposition of the solvent (reduction of water, firstly, and oxidation of water, secondly).

In this precise case, the entire current passing through the electrochemical cell is monopolised by these undesired reactions, leading to what electrochemists call the "solvent wall" phenomenon.

Actinide and polonium ions are very sensitive to the hydrolysis phenomenon, a phenomenon which is a special case of complexing reactions. And when the pH of an aqueous solution containing actinide or polonium ions increases, the structure of the ions is modified. In the case of actinide ions, for example, one or more protons are expelled from the hydration water molecules towards the unbonded water, and at this moment the actinide ion has inner-sphere hydroxyl ions ($OH^-$), and forms hydroxo-, mono- or poly-nuclear complexes which develop towards the formation of solid hydroxide of the form $M(OH)_3$, where M is an actinide.

It is easy to overcome the hydrolysis of actinide ions, or even that of polonium, by keeping them in acidic solutions of concentration greater than 1 M (2 M in the case of polonium) or/and by adding complexing ions ($SO_4^{2-}$) which will delay the hydrolysis. The pH may be easily modified locally at the surface of the working electrode (cathode) by taking advantage of the water reduction, the consequence of which reaction is to form, when a current is present and even in an acidic medium, a basic layer (pH 12-13) according to the following reaction:

$$H_2O + H^+ + 2e^- \rightarrow OH^- + H_2 \quad (1)$$

Electroprecipitation of insoluble actinide hydroxide $M(OH)_3$ can thus be accomplished even in a slightly acidic solution (i.e. one having a pH of between 3 and 5) through the formation of this basic layer in the vicinity of the working electrode according to the following reaction:

$$M^{3+} + 3OH^- \rightarrow M(OH)_3 \quad (2)$$

When the water reduction current is turned off the basic layer disappears and the actinide hydroxide can dissolve more or less rapidly in the electrolyte of acidic pH.

It should be noted that what is concerned here is not "electrodeposition", which is a term reserved for electrochemical reduction of an ion to the metallic state, a reaction mechanism which involves a transfer of electrons, and which leads to the deposition of a metal on a cathode, but "electroprecipitation", the product of which does not result from a transfer of an electron between the electrode and a metal cation, and which leads to a deposit of a metal hydroxide on a cathode by electrochemical reduction of water in the presence of a hydrolysable metal ion such as an actinide or polonium.

The method according to the invention provides an interesting alternative compared to what is currently available in respect of the measurement of alpha radioactivity of an aqueous solution, notably discharge waters, or again evaporation condensates of radioactive effluents. This alternative leads to a substantial time saving during the detection procedure, by combining, in a single system, an immersed alpha radioactivity detector with a cathode for electroprecipitation of the actinide or polonium ions.

According to the invention, the first boron-doped synthetic diamond contact is electrically conductive, and has three separate functions:
- it acts as a cathode during the electroprecipitation of the actinide and/or polonium ions in the form of hydroxides on the first contact;
- it also acts as an electrical contact during the nuclear measurement after, or in the absence of, electroprecipitation of the actinide and/or polonium ions in the form of hydroxides on the first contact;
- finally, it acts as a protective coating against the potential chemical attacks to which the sensor may be subjected during the period of its immersion in the aqueous solution to be measured.

One of the advantages of the invention is that, due to the step of preconcentration, which allows radioactive material to be accumulated at the surface of the detector, the detection limit is lowered, compared to measurements obtained using a conventional immersed detector.

In addition, the detection system used in the method according to the invention has very low background noise, which means that the system's detection limit then depends only on the counting duration.

We shall now describe in detail the detection system used in the method according to the invention.

Figure 1:
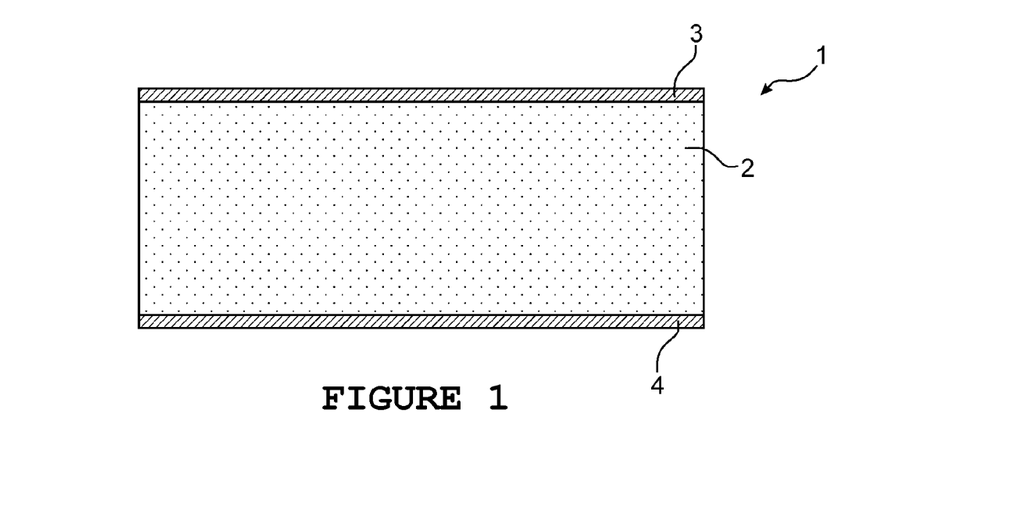
FIG. 1 represents, according to a section view, the sensor of the detection system used in the method according to the invention.

The detector of the detection system according to the invention is a conventional immersible alpha particle detector, except that the first electrical contact is made of boron-doped diamond (FIG. 1). It should be noted that the detector may include a mount, for example a glass mount, the function of which would be to rigidify the substrate made of intrinsic semiconductor material. In this case the substrate must be positioned on the mount such that the face including the boron-doped diamond layer, forming the detector's first electrical contact, remains accessible.

Detector 1 thus includes a substrate made of intrinsic semiconductor material 2, for example a substrate made of high-resistance silicon (i.e. having resistivity greater than $10^4$ $\Omega \cdot cm$), in the form of a plate including two opposing main faces.

One of the main faces of the substrate is covered by a layer of boron-doped polycrystalline diamond forming a first electrical contact 3. This layer is, for example, between 350 and 500 nm thick.

The other main face is, for example, covered with an aluminium layer which is, for example, 100 nm thick: it forms second electrical contact 4.

A first bonding pad (not represented) connecting the electrically conductive surface of the doped diamond layer to a copper electrical conductor (not represented) is installed. A second bonding pad (not represented) connecting the aluminium layer to another copper electrical conductor (not represented) is installed. Both these copper electrical conductors, which are electrically insulated from one another, will be used to measure the current generated between the first and second electrical contacts. Both bonding pads are, for example, produced using a drop of silver enamel (an extrinsic conductive polymer).

Figure 2:
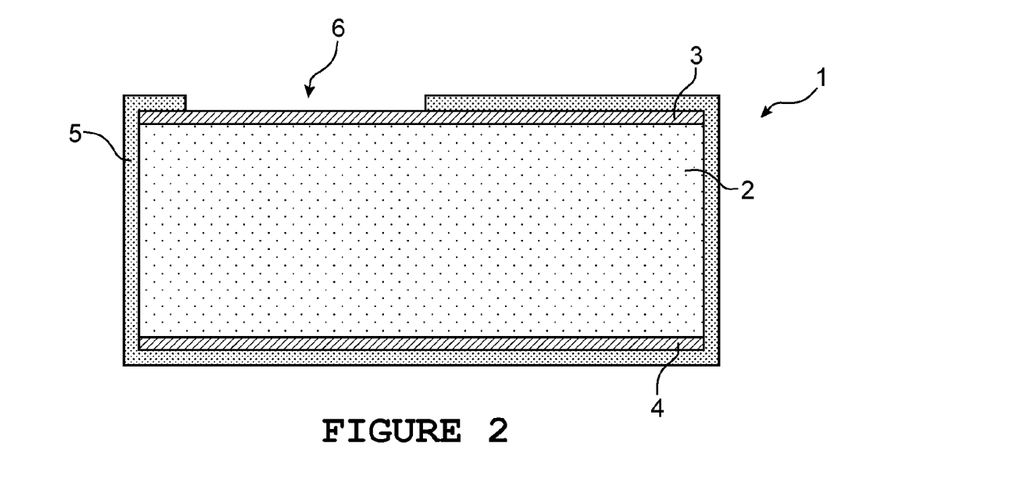
FIG. 2 represents, according to a section view, the sensor of the detection system used in the method according to the invention when the method includes a protective layer made of electrically insulating material.

The assembly thus constituted is preferably then dipped in an electrically insulating material 5, for example an epoxy resin or any other chemically inert polymer material, in order to protect it from corrosion, except for the end of the first copper conductor connected to first contact 3, the end of the second copper conductor connected to second contact 4, and at least a portion of the surface of the first contact (FIG. 2). The portion of the first contact's surface which remains uncovered by the insulating material forms what is called a detection window 6, and lets the alpha emitters reach the underlying intrinsic semiconductor substrate.

To summarise, to produce such a detector, a silicon substrate <111> of high resistivity (>$10^4$ $\Omega \cdot cm$) may, for example, be used, the two main faces of which are polished and are on average 200 μm thick. This type of material is sold notably by the company Siltronix®. It is this silicon substrate which will act as the α particle detector.

The first and second electrical contacts are then installed on each of the two main faces of the silicon substrate in order that they may collect the electrical charges while the alpha particles are detected.

As mentioned above, the first contact, located on the substrate's front face, consists of a boron-doped polycrystalline diamond layer. This layer is produced by chemical vapour deposition (CVD) assisted by microwave plasma. This is a low-pressure, high-temperature deposition method which consists in ionising, by microwaves in a vacuum chamber, a gaseous blend containing a low proportion of methane and trimethylboron (TMB) and a larger quantity of hydrogen gas. As an example, the following proportions may be used: [$CH_4$/$H_2$]=0.22% with TMB diluted in $H_2$ at 2000 ppm. Methane ($CH_4$) is a carbon source which is easy to ionise, while TMB is the source of the doping agent (boron). The hydrogen gas for its part plays an essential role, since it will favour the growth of the diamond phase compared to the graphite phase, which would develop preferentially if it were absent.

To initiate the growth of the boron-doped diamond material on a face of the silicon substrate it is essential to undertake surface treatment of this face (nano seeding) beforehand. This treatment consists in applying a uniform deposit of diamond nanopowder on the face of the substrate, for example by spin-coating from a suspension of diamond nanopowder in a solvent, for example water. The diameter of the diamond nanopowder particles is between 2 and 20 nm; the diameter of the nanopowder particles is preferably 5 nm. The high rotational speed of the substrate (between 2000 and 3000 revolutions per minute over a period of 20 seconds) enables the nanopowder to be deposited uniformly, and also enables the solvent of the suspension to be evaporated. The silicon substrate prepared in this manner can then be used to grow the boron-doped diamond layer.

The growth conditions of the boron-doped diamond layer on one of the faces of the silicon substrate are as follows:
the plasma's microwave power is 1.8 kW;
the pressure and temperature within the growth chamber are respectively 50 mbars and 750° C.;
the gaseous blend consists of 88 sccm of $H_2$, 0.22 sccm of $CH_4$ and 12 sccm of TMB (2000 ppm);
the growth period is 45 hours;
the period of cooling in $H_2$ after growth is 30 minutes.

It is recalled that 1 sccm (standard cubic centimeters per minute) is a volume flow rate under a temperature condition of 0° C. and a pressure condition of 101.325 kPa.

The second contact, located on the rear face of the substrate, may be, as was mentioned earlier, formed of a layer of metal aluminium. This layer is deposited by physical vapour deposition (PVD), in the manner described below, after the diamond layer has been deposited.

The rear face of the silicon substrate (which includes on its front face a layer of doped diamond) is first etched using an oxygen/argon plasma, in order to remove all residual traces of boron-doped diamond.

Etching conditions for cleaning the silicon substrate by an oxygen/argon plasma are as follows:
the gaseous blend consists of 140 sccm of $O_2$ and 42 sccm of Ar;
the pressure within the etching chamber is 60 mbars;
the etching period is 2 to 3 hours;
the RF power is 150 W.

After the plasma etching operation, the silicon substrate covered with a layer of boron-doped diamond is cleaned in an oxidising hot acid bath ($H_2SO_4$+$KNO_3$) intended to remove any organic traces which may derive from the sample mount in the reactor.

After rinsing in ultra-pure water and drying, a deposit of metal aluminium is made on the substrate's rear face by magnetron RF physical vapour deposition (PVD) in an argon plasma. During this step a stainless steel mask is used to prevent aluminium from being deposited on the edges of the substrate. The conditions of this deposition are as follows:
the gaseous blend consists of 42 sccm of argon;
the pressure in the chamber is 6.2 mbars;
the RF power is 150 W;
the deposition period is 3 minutes.

The two silver enamel bonding pads are then produced, one connecting the boron-doped diamond contact (front face), and the other connecting the aluminium contact (rear face) to copper connectors which are electrically insulated from one another.

The assembly obtained in this manner is finally coated in an electrically insulating and sealed material. During the coating operation a small surface window of between, for example, 0.2 and 1 cm$^2$ is left bare in the boron-doped diamond layer, to ensure that the detector operates either in "cathode" mode during the step of electroprecipitation, or in "anode" mode during the step of electrodecontamination of the detector, as we shall see below, or alternatively in "α radiation detector" mode, during the detection step.

The coating material may, for example, be a two-component epoxy resin of the fast-setting Araldite® type (manufactured by Bostik).

Apart from the detector described above, the detection system also includes a counter-electrode, which will allow the electroprecipitation of the actinide and/or polonium ions, and electrodecontamination of the system.

The system produced in this manner operates in two separate steps.

The first step is a step of electroprecipitation of the actinide and/or polonium ions. To do this the liquid medium to be analysed (which is preferably an aqueous medium), which is presumed to contain actinides and/or polonium, is chemically adjusted, in terms both of its pH and of its complexing background salt concentration (for example with the salt $Na_2SO_4$).

Electroprecipitation of the actinide and/or polonium ions on the surface of the first boron-doped diamond electrical contact (cathode) is accomplished by connecting, firstly, the negative pole of the direct current generator (not represented) to the end of the copper conductor connected to the first electrical contact of the detection system's detector and, secondly, the positive pole of this same generator to a static platinum counter-electrode acting as an anode, wherein the detector's first electrical contact (and possibly the entire detector) and the anode are positioned in the liquid medium containing the actinides and/or the polonium.

The static anode may be constituted by a platinum thread, having a diameter of between 1 and 2 mm, and the upper end of which is fitted with a female banana plug to facilitate its connection.

The method of operation chosen for the electroprecipitation is the galvanostatic mode with low cathode current density ($-1.5 < J < -6$ mA/cm$^2$), with vigorous stirring ($10^3$ rpm) for a period of 120 minutes.

Figure 3:
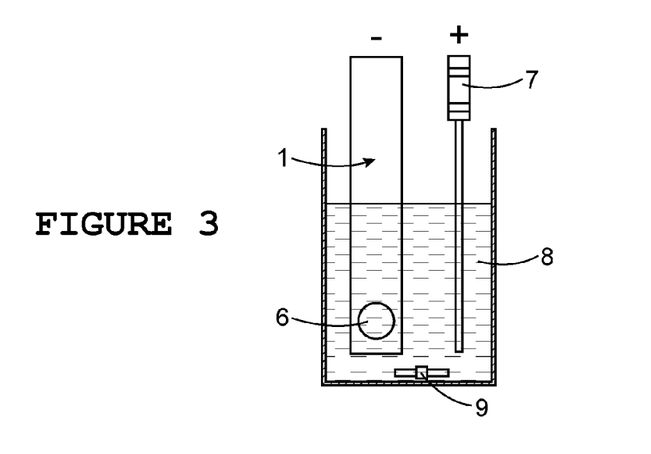
FIG. 3 represents, schematically, the installation used to accomplish the electroprecipitation of the actinide and/or polonium hydroxides contained in a liquid medium, using a detection system according to the invention including an electrode.

For information, a diagram of the installation used to accomplish the electroprecipitation is illustrated in FIG. 3. This shows detector 1, having a detection window 6, first electrical contact 3 of which acts as the cathode, and counter-electrode 7, which acts as the anode, which are dipped in an electrolyte 8 which is being stirred using a Teflon-covered bar magnet 9.

The second step is the step of measurement of the electroprecipitated actinide and/or polonium ions present on the surface of the boron-doped diamond cathode (i.e. on detection window 6 of detector 1).

A conventional α spectrometry system may be connected to the detector.

The α particles derived from the deposition of actinides and/or from the deposition of polonium electroprecipitated at the surface of the boron-doped diamond layer (first contact) will produce in the silicon substrate mobile electron-hole pairs inducing a pulse current. Since the number of counts recorded by the detector is proportional to the quantity of α emitters present on the surface of the first electrical contact (boron-doped diamond layer), it is easy to calculate the actinides and/or polonium concentration of the solution to be analysed by a prior calibration of the detector under measuring conditions.

Examples of Application of the Detection System According to the Invention to Measure the α Activity of an Effluent Containing Americium 241

In the operations of electroprecipitation of americium 241, in addition to the detection system according to the invention, the following are also used:
a glass beaker having a nominal volume of 50 mL and which is covered with Teflon® or PEEK (PolyEtherEtherKetone),
a magnetic stirrer capable of producing 1000 rotations per minute and a bar magnet covered with Teflon®, which is 6 mm in diameter and 25 mm long;
a regulated electrical power supply able to provide up to a direct voltage of 12 V and a current of 10 mA;
a pH electrode and a pH meter;
chemicals, namely $Na_2SO_4$, $H_2SO_4$, NaOH, $NH_3$, a stock solution of $^{241}$Am (~770 kBq/g), a solution of $[HNO_3]=$ 1 M, deionised water (having a resistivity of 18 MΩ·cm) and buffer solutions having pH of 4, 7 and 9.

As regards the operations for nuclear measurement of the americium, in addition to the detection system according to the invention, the following are used:
a light-blocking device such as, for example, a black box, to make the nuclear measurements in darkness;
a signal preamplifier, for example an Amptek A250;
a signal amplifier, for example an Ortec 672;
an encoder module/spectrum analyser, for example an Amptek MCA-8000 A;
a device for displaying spectrometric data, for example a computer and a spectrometry application.

The procedure is as follows.

A 40 mL volume of the solution to be analysed, which contains traces of actinides, is introduced into the beaker of 50 mL nominal volume.

A sufficient quantity of solid background salt, for example solid sodium sulphate ($Na_2SO_4$), is added to it, to adjust the background salt concentration of the electrolyte to 0.3 M.

The solution is stirred mechanically until the added salt is completely solubilised.

The pH of the solution is then adjusted to between 4.0 and 4.5, either by adding a few drops of $[H_2SO_4]=0.05$ M, or by adding a few drops of [NaOH]=0.1 M, depending on the initial pH of the solution to be analysed.

The detector (and in particular the first electrical contact acting as the cathode) and the counter-electrode acting as the anode are immersed in the electrolyte, and connected to the direct current power supply.

The solution is stirred using the bar magnet until an optimum speed is reached (1000 rotations per minute), and electrolysis is undertaken, imposing a current density in the cathode within a current density range of between −1 to −6 mA/cm$^2$ for 120 minutes.

Two minutes before the end of the electrolysis, a 3 mL solution of $NH_3$ (2% in water) is introduced into the electrolyte to increase the pH towards a target value of 9 (the effect of which is to prevent the americium hydroxide from redissolving when the current is cut due to the disappearance of the basic layer produced by the electrochemical reduction of the water in the vicinity of the cathode), and the electrolysis current is then cut off.

The detector is removed from the electrolyte, drained, and then dried in open air without rinsing, before being placed in a plastic bag (protection against radioactive contamination).

The detector protected in this manner is then introduced into a black measuring box, and the α activity is measured by connecting the detector to the counting electronics contained in this black box. The nuclear measurement must be made in darkness due to the presence in the detector of the silicon substrate, which is photosensitive. It should be noted that the requirement to undertake the nuclear measurement in darkness may be disregarded if an opaque layer is previously deposited between the boron-doped diamond and the silicon detector. This could advantageously be accomplished by deposition of a 20 nm layer of DLC (Diamond-Like Carbon) or of a 30 nm layer of a metal chosen from among tungsten, titanium or molybdenum.

After the nuclear measurement the detection window of the detector (cathode) can easily be decontaminated by a first coarse rinsing with a solution of $[H_2SO_4]$=0.1 M, followed by electrolysis in a solution of $[Na_2SO_4]$=0.3 M, by reversing the current polarities compared to the electroprecipitation operation (the (−) pole is connected to the platinum counter-electrode and the (+) pole is connected to the detector) at an anode current density within the range (5±1) mA/cm$^2$ for 15 minutes.

Finally, counting of the background noise for a period of several hours enables the quality of the decontamination to be checked.

It should be noted that if highly complexing agents (surfactants, etc.) are present in the liquid medium to be analysed, a significant reduction of the effectiveness of the operation of electroprecipitation of the actinide and/or polonium ions may be expected, as previously explained. Indeed, the actinide and/or polonium ions, which are then highly complexed, will no longer be able to be hydrolysed effectively in the vicinity of the cathode, nor to be precipitated on it, due to the competition between the surfactant complexing reactions and the hydrolysis reactions.

This difficulty may be overcome if a step of oxidant destruction of the complexing agent is applied prior to the electroprecipitation. This oxidant destruction may, for example, be undertaken with vigorous stirring (>$10^3$ rpm) directly in the medium to be analysed by production, in galvanostatic mode, of free radicals in an anode made not of platinum but of diamond weakly doped with boron (~$10^{19}$ B/cm$^3$) and having an area of several cm$^2$.

Example 1

Measurement of a Range of $^{241}$Am Activity with System SM #1

System SM #1 is a detection system including a detector and an electrode as described above, and in which the detector's first contact has a detection window with an area of 0.17±0.01 cm$^2$.

In a beaker of 50 mL useful volume, 40 mL of a solution of $[Na_2SO_4]$=0.3 M, which has been previously adjusted to a pH of 4.5 using diluted $H_2SO_4$, is introduced.

This solution has been marked by increasing quantities of $^{241}$Am in a range of activity of 0.6 to 30 Bq and has been subjected to constant stirring at 1000 rotations.min$^{-1}$.

Between each addition of americium an alpha counting is undertaken using system SM #1, and it is then decontaminated, before, in all cases, a background noise is measured before any new deposition of radioactive material.

The successive electroprecipitations of americium were undertaken over a period of 2 hours at a cathode current density $J_c$ equal to −6 mA/cm$^2$.

The decontaminations of the system were undertaken by means of a first coarse washing with a solution of $[H_2SO_4]$=0.1 M, followed by electrolysis in anode galvanostatic mode (where the anode current density $J_a$ is +6 mA/cm$^2$) in a solution of $[Na_2SO_4]$=0.3 M with no pH adjustment (pH~6.5) for a period of 15 minutes.

Figure 4:
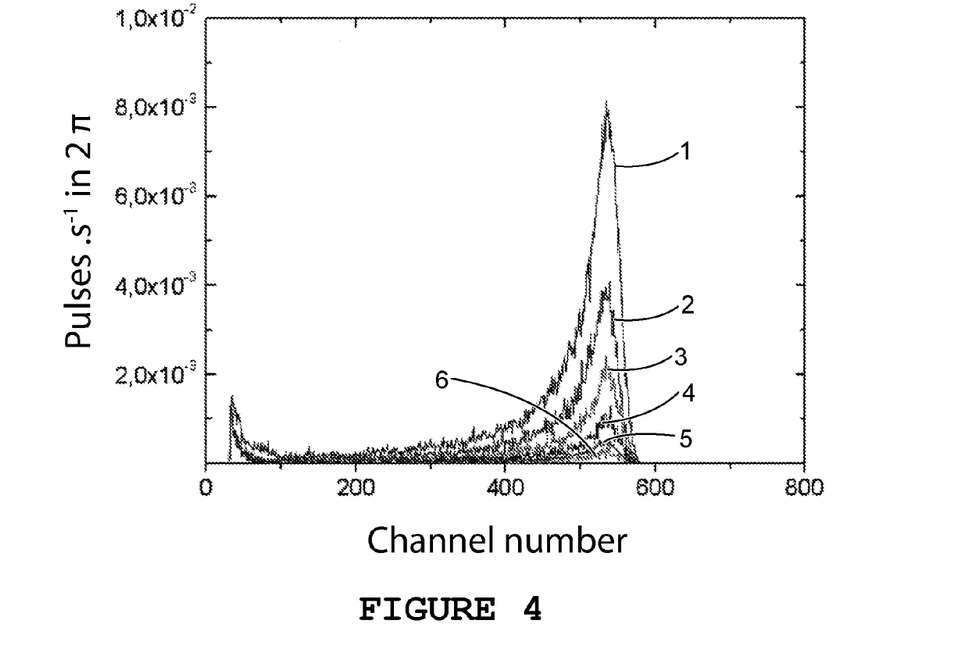
FIG. 4 represents the recorded spectra with an example of a detection system used in the method according to the invention (called system SM #1) after electroprecipitation of different americium 241 activities.

The results obtained with system SM #1 after electroprecipitation of different $^{241}$Am activities are presented in the form of spectra in FIG. 4.

For each of the spectra recorded with system SM #1, the parameters of electrolyte volume (40 mL), pH (4.5), cathode current (−6 mA/cm$^2$), stirring (1000 rotations per minute) and period (2 hours) are unchanged; only the $^{241}$Am activity in the electrolyte is modified.

In FIG. 4 there are thus six spectra corresponding to the following values of $^{241}$Am activity in the electrolyte:

28.30±0.60 Bq (spectrum 1),
14.75±0.60 Bq (spectrum 2),
5.74±0.17 Bq (spectrum 3),
2.87±0.11 Bq (spectrum 4),
1.18±0.05 Bq (spectrum 5),
0.59±0.03 Bq (spectrum 6).

Examining these spectra, an increase of the height of the characteristic peak of americium-241 proportional to the americium activity present initially in the electrolyte is observed.

Figure 5:
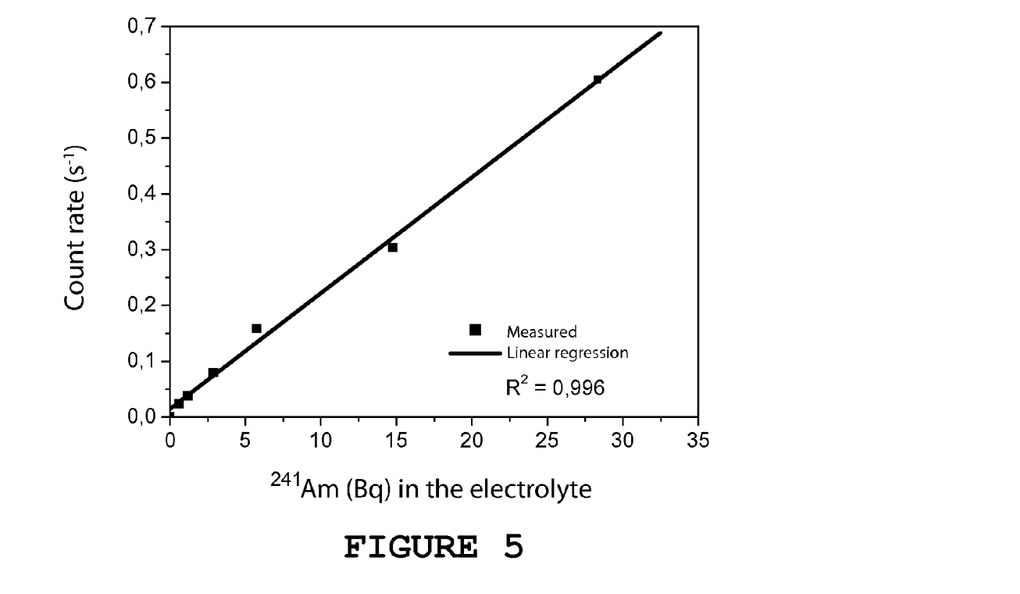
FIG. 5 represents the variations of the count rate ($s^{-1}$) recorded with system SM #1 according to the activity of americium 241 initially present in the electrolyte.

In FIG. 5 the variation of the count rate (s$^{-1}$) recorded with system SM #1 is represented (corresponding to the value of the integral of the characteristic peak of americium-241, minus the background noise, and divided by the counting period in seconds) as a function of the quantity of americium initially present in the electrolyte (Bq).

It is observed that there is a linear relationship between these two magnitudes. This relationship has been demonstrated from a linear regression constructed from the experimental points, for which a coefficient $R^2$ close to 1 ($R^2$=0.996) is obtained. The relationship defined in this manner may consequently indeed be used as a calibration curve with a view to the quantitative analysis of a sample of americium-241 of unknown activity of between 0.6 and 30 Bq in an electrolyte of a given composition.

Example 2

Measurement of a Range of $^{241}$Am Activity with System SM #2

System SM #2 is a detection system including a detector and an electrode as described above, and in which the detector's first contact has a detection window with an area of 0.39±0.01 cm$^2$.

In a beaker of 50 mL useful volume, 40 mL of a solution of $[Na_2SO_4]=0.3$ M, which has been previously adjusted to a pH of 4 using diluted $H_2SO_4$, is introduced.

This solution has been marked by increasing quantities of $^{241}$Am in a range of activity of 0.6 to 30 Bq and has been subjected to constant stirring at 1000 rotations.min$^{-1}$.

Between each addition of americium an alpha counting is undertaken, followed by decontamination of the system, before, in all cases, a background noise is measured before any new deposition of radioactive material.

The successive electroprecipitations of americium were undertaken over a period of 2 hours at a cathode current density $J_c$ equal to −1.6 mA/cm$^2$.

The decontaminations of the system were undertaken by means of a first coarse washing with a solution of $[H_2SO_4]=$ 0.1 M, followed by electrolysis in anode galvanostatic mode ($J_a$ is +5 mA/cm$^2$) in a solution of $[Na_2SO_4]=0.3$ M with no pH adjustment (pH~6.5) for a period of 15 minutes.

Figure 6:
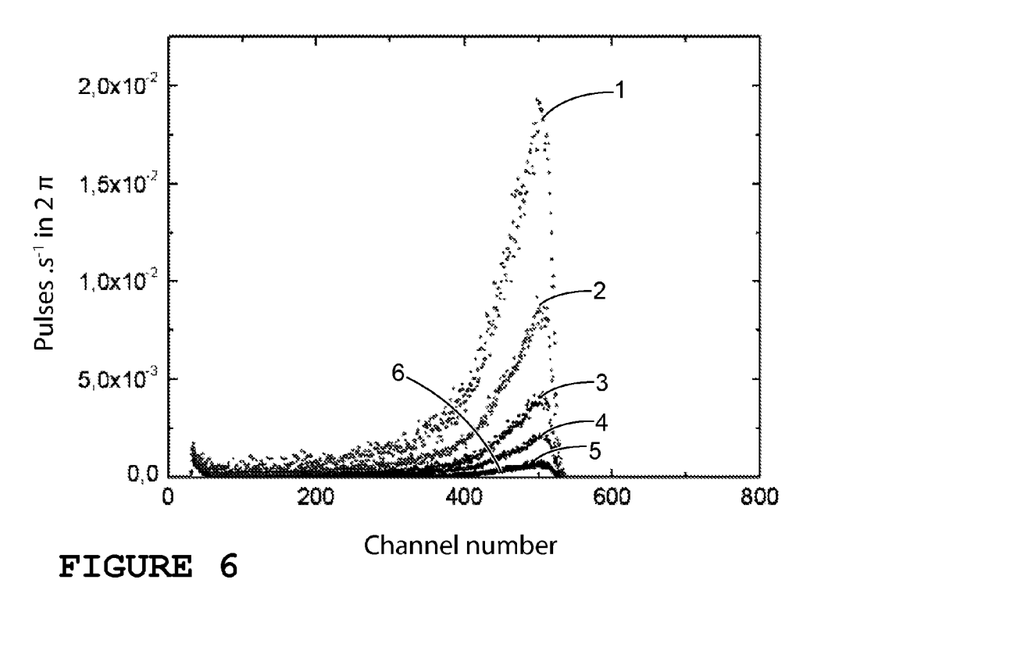
FIG. 6 represents the recorded spectra with another example of a detection system used in the method according to the invention (called system SM #2) after electroprecipitation of different americium 241 activities.

The results obtained with system SM #2 after electroprecipitation of different $^{241}$Am activities are presented in the form of spectra in FIG. 6.

For each of the six spectra recorded with system SM #2, the parameters of electrolyte volume (40 mL), pH (4), cathode current (−1.6 mA/cm$^2$), stirring (1000 rotations per minute) and period (2 hours) are unchanged; only the $^{241}$Am activity in the electrolyte is modified.

The same values of $^{241}$Am activity in the electrolyte as those used in example 1 are used.

Examining these spectra, an increase of the height of the characteristic peak of americium-241 proportional to the americium activity present initially in the electrolyte is observed.

Figure 7:
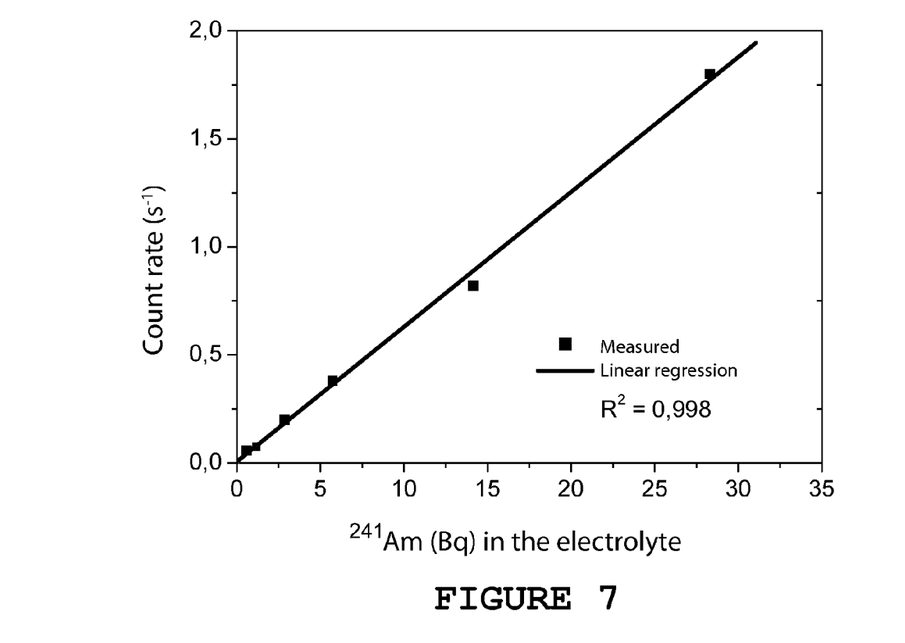
FIG. 7 represents the variations of the count rate ($s^{-1}$) recorded with system SM #2 according to the activity of americium 241 initially present in the electrolyte.

In FIG. 7 the variation of the count rate (s$^{-1}$) recorded with system SM #2 is represented (corresponding to the value of the integral of the characteristic peak of americium-241, minus the background noise, and divided by the counting period in seconds) as a function of the quantity of americium initially present in the electrolyte (Bq).

It is observed that there is a linear relationship between these two magnitudes. This relationship has been demonstrated from a linear regression constructed from the experimental points, and for which a coefficient $R^2$ close to 1 ($R^2=0.998$) is obtained. The relationship defined in this manner may consequently indeed be used as a calibration curve with a view to the quantitative analysis of a sample of americium of unknown activity of between 0.6 and 30 Bq in an electrolyte of a given composition.

A summary of the results obtained with system SM #1 in example 1 and system SM #2 in example 2 is recorded in table 1 below.

Example 3

Electrochemical Decontamination of the Systems

As an example, we undertook a nuclear measurement of system SM #1 after electroprecipitation of $^{241}$Am having an activity of 2.87 Bq in the electrolyte; the measured net count rate is 0.08 counts per second.

This system is then subjected to electrochemical decontamination according to the following procedure.

Initially, system SM #1 is rinsed with a solution of $[H_2SO_4]=0.1$ M, and is then placed in a beaker of 50 mL useful volume containing 40 mL of a solution of $[Na_2SO_4]=0.3$ M with no prior pH adjustment (pH~6.5).

The first contact of the system's detector is connected to the (+) pole of the current generator and the system's counter-electrode consisting of a platinum wire is connected to the (−) pole of this same current generator.

Electrochemical decontamination of the system is undertaken in galvanostatic mode at an anode current density of $J_a=+6$ mA/cm$^2$ with stirring (1000 revolutions per minute) for a period of 15 minutes.

After the current is switched off the detector and the platinum counter-electrode are recovered, rinsed in deionised water and then dried in air.

Figure 8:
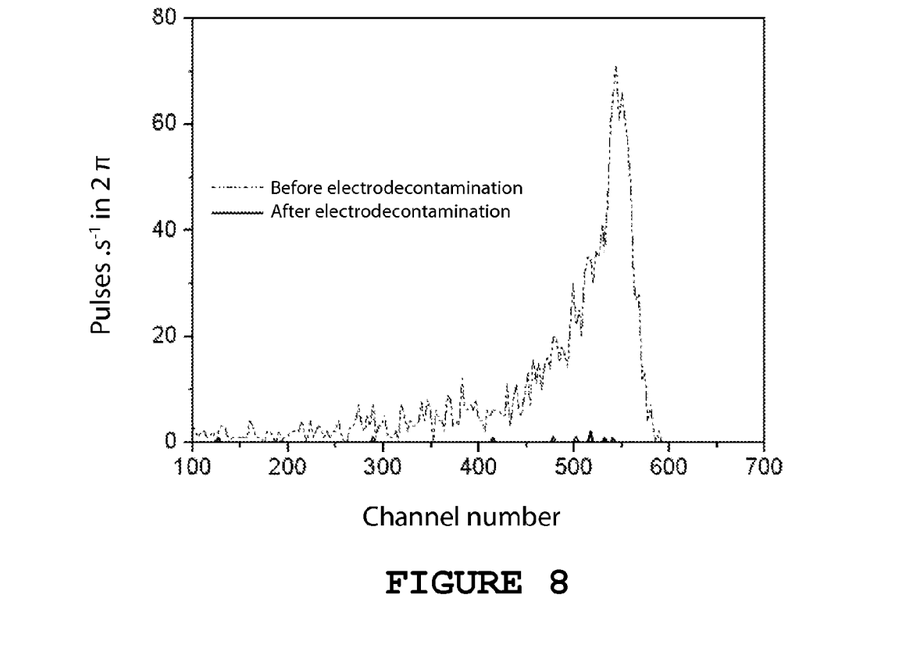
FIG. 8 represents the recorded spectra with system SM #1 after electroprecipitation of americium 241, and then after electro decontamination.

The α spectra recorded respectively following the electroprecipitation of americium on the first contact of the detector of system SM #1 for an activity of 2.87 Bq in the electrolyte and after electrodecontamination are represented in FIG. 8.

A nuclear measurement of the detector of system SM #1 after electrochemical decontamination gives a net count rate of 0.004 counts per second, which corresponds to a decontamination efficiency of 95%.

Other results of electrodecontamination operations of systems SM #1 and SM #2 after electroprecipitation of different levels of $^{241}$Am radioactivity are shown in table 2 below. It shows the decontamination performance characteristics of systems SM #1 and SM #2.

TABLE 1

| | | | | SM # 1 | | SM # 2 | |
| --- | --- | --- | --- | --- | --- | --- | --- |
| Stock solution (Bq/g) | Dispersed volume (µL) | Dispersed activity (Bq) | Uncertainty relating to dispersed activity (Bq) | Count rate (s$^{-1}$) | Relative uncertainty relating to the count rate (%) | Count rate (s$^{-1}$) | Relative uncertainty relating to the count rate (%) |
| 546 | 50 | 28.30 | 0.60 | 0.605 | 0.5 | 1.799 | 0.6 |
| | 25 | 14.75 | 0.60 | 0.304 | 0.7 | 0.821 | 0.5 |
| 111 | 50 | 5.75 | 0.17 | 0.159 | 1.0 | 0.380 | 0.6 |
| | 25 | 2.87 | 0.11 | 0.080 | 1.4 | 0.199 | 0.6 |
| 23 | 50 | 1.18 | 0.05 | 0.038 | 1.0 | 0.073 | 1.0 |
| | 25 | 0.59 | 0.03 | 0.024 | 2.5 | 0.059 | 0.9 |

TABLE 2

| | SM # 1 | | | | SM # 2 | | | | |
|---|---|---|---|---|---|---|---|---|---|
| $^{241}$Am in solution (Bq) | 0.59 | 2.87 | 5.74 | 14.75 | 0.59 | 1.18 | 2.87 | 5.74 | 14.75 |
| Count rate before decontamination ($s^{-1}$) | 0.024 | 0.080 | 0.159 | 0.304 | 0.059 | 0.073 | 0.199 | 0.380 | 0.821 |
| $J_a$ (mA/cm$^2$) | 6 | | | | 5 | | | | |
| Count rate after decontamination ($s^{-1}$) | 0.0047 | 0.0040 | 0.0014 | 0.0058 | 2.76 10$^{-4}$ | 6.49 10$^{-4}$ | 2.63 10$^{-4}$ | 3.60 10$^{-4}$ | 8.41 10$^{-4}$ |
| Decontamination efficiency (%) | 80.40 | 95.00 | 99.12 | 98.10 | 99.53 | 99.11 | 99.86 | 99.90 | 99.90 |

In conclusion, we have shown above the feasibility of a detection system and a measuring method according to the invention through examples using $^{241}$Am as a radiochemical tracer. It is self-evident that this detection system is also applicable to the other isotopes of americium. In addition, due to the similarity of chemical properties in the actinides family, such a system can also be extended to measuring isotopes of plutonium, curium and neptunium. Polonium-210 may also be added to this list, since this is a pure alpha emitter and, although it does not belong to the actinides family, it is an element which is easily hydrolysable, and which can therefore be used in the electroprecipitation method according to the invention.

BIBLIOGRAPHY

[1] S. F. Kozlov, E. A. Konorova, M. I. Krapivin, V. A. Nadein, "Usage of diamond detectors as immersed alpha-counters", IEEE Transactions on nuclear science, Vol NS-24, N°1 (1977), pages 242-243.

[2] I. Feist, K. Vdolecek, C. Konecny, Radiochem. Radioanal. Lett., Vol 36, (2-3) (1978), page 101.

[3] M. I. Krapivin, I. A. Lebedev, B. F. Myasoedov, V. G. Yudina, A. A. Yakobson, V. Y. Frenkel, Radiokhimia, Vol 21, N°2 (1979), page 321.

[4] A. Robert, C. Stella, R. Heindl, "Nuclear Instruments and Methods in Physics Research", Vol. A, 225 (1) (1984), page 179.

[5] P. Bergonzo, F. Foulon, A. Brambilla, D. Tromson, C. Jany, S. Haan, "Corrosion hard CVD diamond alpha particle detectors for nuclear liquid source monitoring", Diamond and Related Materials, Vol. 9 (2000), pages 1003-1007.

[6] O. B. Egorov, R. S. Addleman, M. J. O'Hara, T. Marks, J. W. Grate, "Direct measurement of alpha emitters in liquids using passivated ion implanted planar silicon (PIPS) diode detectors", Nuclear Instruments and Methods in Physics Research, A 537 (2005), pages 600-609.

[7] E. Vitorge, "Chimie des actinides" [Chemistry of actinides], Techniques de l'ingénieur, BN 3520-2 (1999).

The invention claimed is:

1. A method for detecting alpha activity of a liquid medium containing ions of at least one actinide and/or polonium ions, wherein said method includes the following successive steps:
 a) provision of an in situ system for detecting alpha particles in a liquid medium, wherein the in situ system includes:
  an alpha particle detector including an assembly formed of a substrate made of an intrinsic semiconductor material which is sandwiched between two layers made of electrically conductive materials, respectively forming a first and a second electrical contact, wherein the first contact is intended to be in contact with the liquid medium, and is made from boron-doped diamond;
  a counter-electrode made of an electrically conductive material, intended to be brought into contact with the liquid medium; and
  means to connect said counter-electrode and the first electrical contact of the detection system's detector to an electrical current source in order to allow the ions present in the liquid medium to flow from the counter-electrode to the detector's first electrical contact, or vice versa;
 b) bringing the first contact of the detection system's detector into contact with the liquid medium, and bringing the detection system's counter-electrode into contact with the liquid medium;
 c) detection of the alpha particles which are stopped in the detector's substrate after passing through said detector's first electrical contact;
  wherein the method further includes, before step c), the following successive steps:
   a step of preparation of an electrolyte including ions of at least one actinide and/or polonium ions in the form of soluble complexes obtained from said ions of at least one actinide and/or from said polonium ions present in the liquid medium by adding a complexing salt, and possibly an element chosen from among an acid or a base, to the liquid medium, and by applying, after step b), an electrical current between the detection system's counter-electrode and the first electrical contact of the detection system's detector;
   a step of electroprecipitation of said actinide and/or polonium ions in the form of insoluble actinide and/or polonium hydroxides on the first contact of the detection system's detector, by maintaining said electrical current between the detection system's counter-electrode and the first electrical contact of the detection system's detector, wherein the alpha particles detected in step c) derive at least partly from the insoluble actinide and/or polonium hydroxides present on the first electrical contact.

2. The detection method according to claim 1, further includes, after step c), a step of decontamination of the first contact of the detection system's detector in an electrolyte by applying an electrical current between the first contact and the counter-electrode, wherein the direction of the current is reversed relative to the direction of the current applied during the step of electroprecipitation.

3. The detection method according to claim 1, wherein the first contact of the detection system's detector is brought into contact with the liquid medium in step b) by immersing the detector in the liquid medium.

4. The detection method according to claim 1, wherein the electrolyte has a pH of between 4 and 4.5.

5. The detection method according to claim 1, wherein the complexing salt is sodium sulphate.

6. The detection method according to claim 1, wherein the electrolyte is an aqueous solution.

7. The detection method according to claim 6, wherein the electrolyte also includes a solvent chosen from among dimethyl sulfoxide (DMSO) and dimethylformamide (DMF).

8. The detection method according to claim 1, wherein said at least one actinide is chosen from among the isotopes of americium, curium, neptunium, plutonium and uranium.

9. The detection method according to claim 1, wherein the liquid medium is an effluent, for example floor washing water or evaporation distillates of radioactive effluents.

* * * * *